United States Patent [19]

Covitch

[11] 4,366,262
[45] Dec. 28, 1982

[54] METHOD FOR CATALYZED CONVERSION OF PERFLUOROCARBON CATIONIC EXCHANGE FUNCTIONALITY WITH SF$_4$

[75] Inventor: Michael J. Covitch, Cleveland Hts., Ohio

[73] Assignee: Diamond Shamrock Corporation, Dallas, Tex.

[21] Appl. No.: 277,885

[22] Filed: Jun. 26, 1981

[51] Int. Cl.$^3$ .............................................. B01J 39/20
[52] U.S. Cl. ...................................... 521/33; 525/343
[58] Field of Search .......................... 521/33; 525/343

[56] References Cited

U.S. PATENT DOCUMENTS 3,000,694  9/1961  Smith ...................................... 23/14
3,026,179  3/1962  Smith ..................................... 23/203
3,976,691  8/1976  Middleton ....................... 260/544 F
4,200,711  4/1980  Onoue et al. ........................ 52/388

FOREIGN PATENT DOCUMENTS 2014585  2/1979  United Kingdom .

OTHER PUBLICATIONS

Annals New York Academy of Sciences, 145, 161–168, (1967) by D. G. Martin.
Journal of the American Chemical Society, 82, 543–551 (1960) by W. R. Haset et al.
Journal Organic Chemistry, vol. 40, No. 5, 1975 by W. Middleton, pp. 574–578.
21 Organic Reactions (selected pp.).

Primary Examiner—Joseph L. Schofer
Assistant Examiner—Peter F. Kulkosky
Attorney, Agent, or Firm—Woodrow W. Ban

[57] ABSTRACT

Method for converting pendant functional groups, particularly upon perfluorocarbon copolymeric cationic exchange materials, to sulfonyl fluoride pendant functional groups. The method comprises a catalyzed reaction between the perfluorocarbon functional group and SF$_4$ under pressure at relatively mild reaction temperatures.

18 Claims, No Drawings

METHOD FOR CATALYZED CONVERSION OF PERFLUOROCARBON CATIONIC EXCHANGE FUNCTIONALITY WITH SF4

TECHNICAL FIELD

This invention relates to polymeric cationic exchange materials and to methods for modifying or recovering and reusing those materials. Particularly this invention relates to methods for converting cation exchange functional groups of cation exchange materials such as electrolytic cell membranes whereby physical characteristics such as solubility or anion permability of the cation exchange material can be altered.

BACKGROUND OF THE INVENTION

Cation exchange materials are finding increased acceptance in electrolytic cells, and particularly in chlorine generating cells. The cation exchange membranes in such cells are utilized to divide the cells into anode and cathode compartments. These membranes function to pass metal cations arising from electrolytic activity at the cell anode from the anode to the cathode compartment. At the same time, these membranes substantially resist movement of anions from the cell cathode to the anode compartment. The membranes assure a cathode product substantially free of contamination by electrolytes present in the anode compartment of the cell while reducing electrical inefficiency in cell operation by reducing migration of anions from the cathode to the anode compartment where such anions would react.

While a variety of cationic exchange membranes have been utilized in fabricating electrolytic cells, one material in particular has found acceptance. Membranes fabricated from copolymeric vinyl ethers, products of E. I. duPont called Nafion ® have produced superior results in electrochemical cells and particularly in chlorine cells.

These NAFION compounds are known as perfluorocarbons and are a copolymer of at least two monomers with one monomer being selected from a group including vinyl fluoride, hexafluoropropylene, vinylidene fluoride, trifluoroethylene, chlorotrifluoroethylene, perfluoro(alkylvinyl ether), tetrafluoroethylene and mixtures thereof.

The second monomer often is selected from a group of monomers usually containing an $SO_2F$ or sulfonyl fluoride group. Examples of such second monomers can be generically represented by the formula $CF_2=CFR_1SO_2F$. $R_1$ in the generic formula is a bifunctional perfluorinated radical comprising generally 1 to 8 carbon atoms but upon occasion as many as 25. One restraint upon the generic formula is a general requirement for the presence of at least one fluorine atom on the carbon atom adjacent the $-SO_2F$ group, particularly where the functional group exists as the $-(-SO_2NH)_mQ$ form. In this form, Q can be hydrogen or an alkali or alkaline earth metal cation and m is the valence of Q. The $R_1$ generic formula portion can be of any suitable or conventional configuration, but it has been found preferably that the vinyl radical comonomer join the $R_1$ group through an ether linkage.

Typical sulfonyl fluoride containing monomers are set forth in U.S. Pat. Nos. 3,282,875; 3,041,317; 3,560,568; 3,718,627 and methods of preparation of intermediate perfluorocarbon copolymers are set forth in U.S. Pat. Nos. 3,041,317; 2,393,967; 2,559,752 and 2,593,583. These perfluorocarbons generally have pendant $SO_2F$ based functional groups.

Chlorine cells equipped with separators fabricated from perfluorocarbon copolymers have been utilized to produce a somewhat concentrated caustic product containing quite low residual salt levels. Perfluorocarbon copolymers containing perfluoro(3,6-dioxa-4-methyl-7-octenesulfonyl fluoride) comonomer have found particular acceptance in $Cl_2$ cells.

Ion exchange functionality is generally imparted to such ion exchange membranes by saponification with caustic or the like. In chlorine cells using a sodium chloride brine feedstock, one drawback to the use of perfluorocarbon separators having pendant saponified sulfonyl fluoride based functional groups has been a relatively low resistance in desirably thin separators to back migration of caustic including $OH^-$ radicals from the cathode to the anode compartment. This back migration contributes to a lower current utilization efficiency in operating the cell since the $OH^-$ radicals react at the anode to produce oxygen. It is known that amination of these groups can produce enhanced back migration resistance but also interferes with cation migration requiring higher cell voltages. Recently, it has been found that if pendant sulfonyl fluoride based cationic exchange groups adjacent one separator surface were converted to pendant carboxylate groups, the back migration of $OH^-$ radicals in such $Cl_2$ cells would be significantly reduced. Conversion of sulfonyl fluoride groups to carboxylate groups is discussed in U.S. Pat. No. 4,151,053.

Presently, perfluorocarbon separators are generally fabricated by forming a thin membrane-like sheet under heat and pressure from one of the intermediate copolymers previously described. The ionic exchange capability of the copolymeric membrane is then activated by saponification with a suitable or conventional compound such as a strong caustic. Generally, such membranes are between 0.5 mil and 150 mil in thickness. Reinforced perfluorocarbon membranes have been fabricated, for example, as shown in U.S. Pat. No. 3,925,135.

Presently, saponified or aminated copolymer or perfluorocarbon copolymer resin structures having sulfonyl based functionality and becoming useless for whatever reason are generally discarded. Were it convenient to convert the functional groups upon these resin structures back to $SO_2F$, these resins could then be recycled, resulting in significant cost savings. Further, where it is desired that surface portions of a saponified or aminated NAFION having sulfonyl fluoride based functional groups be converted to an alternate functionality, this conversion is often more readily accomplished from $SO_2F$ functional groups.

DISCLOSURE OF THE INVENTION

The present invention provides a method for forming or converting to sulfonyl fluoride, functional groups in polymeric materials including at least one of: (a) attached cation exchange functional sites based upon sulfonyl halide; or (b) polymeric cross linking sites based upon sulfonyl halide. In the method, the polymeric material is contacted with $SF_4$ and a catalyst under pressure. Contact is maintained for greater than about 0.1 hour and at a temperature greater than about $-20°$ C. but less than about $200°$ C.

In preferred embodiments of the method, the polymeric resin is NAFION having pendant sulfonyl halide based functional groups or sulfonyl halide based cross linking sites.

The above and other features and advantages of the invention will become more apparent when considered with the following detailed description of the invention and illustrative examples which form a part of the specification.

BEST EMBODIMENT OF THE INVENTION

In the preferred embodiment, the instant invention is a method for converting functional groups and cross linking sites in a perfluorinated polymeric structure that are derivatives of sulfonyl halide to sulfonyl fluoride. These structures are most frequently formed from NAFION, and NAFION containing the converted sites can be recycled and reprocessed, solvent processed, or treated to contain carbonyl fluoride based functional groups.

Copolymer perfluorocarbon desirably is available as an intermediate copolymer precursor which can be readily converted to a copolymer containing ion exchange sites. However, the perfluorocarbon is more generally available in sheets already converted to provide active ion exchange sites. These sites on the final copolymer provide the ion exchange functional utility of the perfluorocarbon copolymer. The sheets are frequently sized for use as membranes in electrolytic cells.

The intermediate copolymer is prepared from at least two monomers that include halide, generally fluorine substituted sites. At least one of the monomers comes from a group that comprises vinyl fluoride, hexafluoropropylene, vinylidene fluoride, trifluoroethylene, chlorotrifluoroethylene, perfluoro(alkyl vinyl ether), tetrafluoroethylene and mixtures thereof.

In the intermediate copolymer, at least one of the monomers comes from a grouping having members with functional groups capable of imparting cationic exchange characteristics to the final copolymer. Monomers containing pendant sulfonyl, carbonyl or, in some cases phosphoric acid based functional groups are typical examples. Condensation esters, amides or salts based upon the same functional groups can also be utilized. Additionally, these second group monomers can include a functional group into which an ion exchange group can be readily introduced and would thereby include oxyacids, salts, or condensation esters of carbon, nitrogen, silicon, phosphorus, sulfur, chlorine, arsenic, selenium, or tellurium.

Among the preferred families of monomers, in the second grouping are sulfonyl containing monomers containing the precursor functional group $SO_2F$ or $SO_3$ alkyl. Examples of members of such a family can be represented by the generic formula of $CF_2=CFSO_2F$ and $CF_2=CFR_1SO_2F$ where $R_1$ is a bifunctional perfluorinated radical comprising 1 to 8 carbon atoms, and upon occasion as many as 25.

The particular chemical content or structure of the perfluorinated radical linking the sulfonyl group to the copolymer chain is not critical and may have fluorine, chlorine or hydrogen atoms attached to the carbon atom to which the sulfonyl group is attached, although the carbon atom to which the sulfonyl group is attached must also have at least one fluorine atom attached. Preferably the monomers are perfluorinated. If the sulfonyl group is attached directly to the chain, the carbon in the chain to which it is attached must have a fluorine atom attached to it. The $R_1$ radical of the formula above can be either branched or unbranched, i.e., straight chained, and can have one or more ether linkages. It is preferred that the vinyl radical in this group of sulfonyl fluoride containing comonomers be joined to the $R_1$ group through an ether linkage, i.e., that the comonomer be of the formula $CF_2=CFOR_1SO_2F$. Illustrative of such sulfonyl fluoride containing comonomers are:

$$CF_2=CFOCF_2CF_2SO_2F, \quad CF_2=CFOCF_2CFOCF_2CF_2SO_2F,$$
$$\underset{CF_3}{|}$$

$$CF_2=CFOCF_2CFOCF_2CFOCF_2CF_2SO_2F,$$
$$\underset{CF_3}{|} \quad \underset{CF_3}{|}$$

$$CF_2=CFCF_2CF_2SO_2F, \text{ and } CF_2=CFOCF_2CFOCF_2CF_2SO_2F$$
$$\underset{\underset{\underset{CF_3}{|}}{\underset{O}{|}}}{\underset{CF_2}{|}}$$

The corresponding esters of the aforementioned sulfonyl fluorides are equally preferred.

While the preferred intermediate copolymers are perfluorocarbon, that is perfluorinated, others can be utilized where there is a fluorine atom attached to the carbon atom to which the sulfonyl group is attached. A highly preferred copolymer is one of tetrafluoroethylene and perfluoro(3,6-dioxa-4-methyl-7-octenesulfonyl fluoride) comprising between 10 and 60 weight percent, and preferably between 25 and 40 weight percent, of the latter monomers.

These perfluorinated copolymers may be prepared in any of a number of well-known manners such as is shown and described in U.S. Pat. Nos. 3,041,317; 2,393,967; 2,559,752 and 2,593,583.

An intermediate copolymer is readily transformed into a copolymer containing ion exchange sites by conversion of the sulfonyl groups ($-SO_2F$ or $-SO_3$ alkyl) to the form $-SO_3Z$ by saponification or the like wherein Z is hydrogen, an alkali metal, or an alkaline earth metal. The converted copolymer contains sulfonyl group based ion exchange sites contained in side chains of the copolymer and attached to carbon atoms having at least one attached fluorine atom. Not all sulfonyl groups within the intermediate copolymer need be converted. The conversion may be accomplished in any suitable or customary manner such as is shown in U.S. Pat. Nos. 3,770,547 and 3,784,399.

An electrolytic cell membrane made from copolymeric perfluorocarbon having sulfonyl based cation exchange functional groups possesses a relatively low resistance to back migration of sodium hydroxide from the cathode side of the membrane to the anode side of the membrane, although such a membrane successfully resists back migration of other caustic compounds such as KOH. Often the sulfonyl fluoride groups are aminated to provide greater resistance to sodium hydroxide back migration.

In many cell applications, the separator or membrane includes a zone having copolymeric perfluorocarbon containing pendant sulfonyl based ion exchange functional groups and a second zone having copolymeric perfluorocarbon containing pendant carbonyl based functional ion exchange groups. The pendant carbonyl based groups provide the copolymeric perfluorocarbon membrane with significantly greater resistance to the back migration of sodium hydroxide, but can also substantially reduce the rate of migration of sodium ions from the anode to the cathode. In order to present a relatively small additional resistance to the desired migration of sodium ions, the carbonyl based zone is provided to be only of sufficient dimension to produce a significant effect upon the back migration of sodium hydroxide.

Copolymeric perfluorocarbon having pendant carbonyl based cationic exchange functional groups can be prepared in any suitable or conventional manner such as in accordance with U.S. Pat. No. 4,151,053 or Japanese Patent Application No. 52(1977)38486 or polymerized from a carbonyl functional group containing monomer derived from a sulfonyl group containing monomer by a method such as is shown in U.S. Pat. No. 4,151,053. Carbonyl conversions are often accomplished from NAFION intermediate resin containing pendant $SO_2F$ functional groups as shown for example in Ger. Offen No. 2,817,315 (U.S. Application Ser. No. 789,726). Preferred carbonyl based monomers include $CF_2=CF-O-CF_2-CF(CF_3)O(CF_2)_2COOCH_3$ and $CF_2=CF-O-CF_2-CF(CF_3)OCF_2COOCH_3$.

Alternately to carbonyl based groups, the zone can include perfluorocarbon having sulfonamide functionality of the form $-R_1SO_2NHR_2$ where $R_2$ can be hydrogen, alkyl, substituted alkyl, aromatic or cyclic hydrocarbon. Methods for providing sulfonamide based functionality are shown in U.S. Pat. Nos. 3,969,285 and 4,113,585.

Preferred copolymeric perfluorocarbons utilized in the instant invention include sulfonyl groups or cross linking sites represented by the formula $-OCF_2CF_2X$ and/or $-OCF_2CF_2Y-B-YCF_2CF_2O-$ wherein X is sulfonate ester, usually methyl ($SO_2OCH_3$) or ionic sulfonate ($SO_3^-Z^+$), Y is sulfonyl ($-SO_2-$), B is a cross linking structure and Z is hydrogen, a quaternary amine, an alkali metal such as lithium, hydrogen, cesium and rubidium, potassium and sodium, or an alkaline earth metal such as beryllium, magnesium, calcium, strontum, barium and radium.

Generally, sulfonyl and sulfonate esters and sulfonyl based amide forms of the perfluorocarbon copolymer are readily converted to a salt form by treatment with a strong alkali such as NaOH but equally may be used in the instant invention without saponification.

This invention performs satisfactorily when utilized with NAFION having functional cation exchange groups selected from a group consisting of the pendant structures $O(CF_2)_xCF_2SO_3^-Z^+$, $O(CF_2)_xCF_2SO_2OCH_3$. Alternately, the cross linking structures $O(CF_2)_xCF_2SO_2-B-SO_2CF_2(CF_2)_xO$ pendantly connecting or cross linking adjacent perfluorocarbon chains may be attacked using the instant invention and converted to adjacent $SO_2F$ functional groups. In these structures, $0 \leq X \leq 24$, B is selected from a group consisting of the structures $-O-$, $-O-O-$, and di and poly amines of a form $-NH(CR_1R_2)_xNH-$ with $R_1$ and $R_2$ being hydrogen, halogen, an amine group, and short chain alkanes and alkenes, generally of 5 carbons or less, and Z is one of an alkali or alkaline metal, hydrogen, and an ammonium ion.

Perfluorocarbon copolymer such as NAFION copolymer having functional groups based upon ionic sulfonates, sulfonamides, and sulfonate esters or cross linking sites based upon sites derived from sulfonyl based functional groups may be converted to pendant sulfonyl fluoride. The conversion is effected by contacting the copolymer with $SF_4$ under pressure, in the presence of a catalyst.

The conversion runs well at temperatures between $-20°$ C. and $200°$ C. Conversion at temperatures in excess of $200°$ C. is feasible; however, perfluorocarbon ion exchange functionality may be somewhat reduced following exposure to temperatures significantly in excess of $200°$ C. Preferably the temperature is between $20°$ C. and $60°$ C.

The pressure under which the conversion may be operated can vary from effectively 0 psi to practical limitations of equipment in which the reaction occurs. However, it is convenient and preferred that the pressure be the autogenous pressure of the $SF_4$ and catalyst at the selected reaction temperature. Typically this pressure will exceed 10 psig.

The following reaction has been postulated for the conversion of sulfonate forms of perfluorocarbon copolymer such as NAFION:

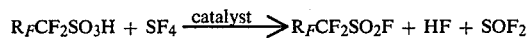

$$R_FCF_2SO_3H + SF_4 \xrightarrow{catalyst} R_FCF_2SO_2F + HF + SOF_2$$

where $R_F$ is any suitable or conventional vinyl ether copolymeric backbone structure. Similar reactions may be prostulated for other resin functional groups.

The conversion occurs most favorably in substantial excesses of $SF_4$. Preferably, perfluorocarbon copolymer to be converted is immersed in liquid $SF_4$. Where the copolymer is to be reformed or converted to an $SO_2F$ form, the copolymer is relatively finely divided to generally particles smaller than 40 mesh and completely immersed in $SF_4$. For some end uses of converted perfluorocarbon copolymer, complete immersion may not be desirable. Where, for example, one surface of a NAFION copolymeric membrane is to be converted to copolymer having carbonyl based functional groups, only that surface of the membrane should be treated to convert surface copolymer to sulfonyl fluoride functionality for later conversion to carbonyl base functional groups. Configurations in which only a single membrane surface is exposed to a treating fluid are well-known.

Substantial excesses of $SF_4$ are required. For desirable conversion rates and to assure desirable overall conversion of perfluorocarbon copolymer functional groups, an excess of generally at least 10 moles $SF_4$ per equivalent of the perfluorocarbon resin is generally required.

One factor substantially influencing both the rate of conversion of functional groups and the degree to which all groups in a copolymeric perfluorocarbon conversion charge are converted is the catalyst. Absent suitable catalytic effect, conversions are quite slow, with only about between 30 and 45 percent of available sites being converted after about 48 hours contact. Using a suitable catalyst, relatively rapid conversions of in excess of 85 percent of available sites can be achieved.

Suitable catalysts include Lewis acids well-known in the art and hydrogen fluoride, HF. Hydrogen fluoride, because of its relatively low cost, has been found particularly acceptable. Hydrogen fluoride is introduced into the $SF_4$ and copolymer to catalyze the reaction. It has been found that, for HF, the catalyst should be present in an amount greater than 10 moles HF per equivalent of copolymer, where the copolymer perfluorocarbon is in an equivalent weight range of between about 1100 and 1200.

Preferably, the HF is present in greater than 0.01 mole per gram of NAFION. For the Best Embodiment, it is preferred that HF be present in a ratio of between about 0.18 and 0.26 HF per gram of copolymer where the copolymeric perfluorocarbon is in an equivalent weight range of between about 1100 and 1200.

The conversion appears to occur from surfaces of perfluorocarbon copolymer particles inward. Therefore, the more finely divided the copolymer, generally the more rapidly the reaction will be completed. Increasing temperature and/or pressure can accelerate this reaction somewhat towards conversion completion. Where a single surface of a membrane is to be converted, the conversion has been found to proceed relatively uniformly into the depth of the membrane over the entire membrane surface contacting the $SF_4$. By timing the duration of exposure to the $SF_4$ and catalyst, the depth to which conversion penetrates a membrane can be controlled.

It has been found that a suitable solvent such as FREON 113 may be used for diluting the $SF_4$ during reaction. This solvent tends to swell perfluorocarbon copolymer reacting with the $SF_4$ facilitating penetration of the $SF_4$ and HF into the copolymer particles. Time to run conversions to completion is thereby decreased.

One factor, water, has been found somewhat adverse to the conversion. Even part per million levels of water can lower overall conversions and decrease reaction or conversion rates. Even small water levels can cause severe corrosion difficulties. Therefore, careful drying of all equipment and reactants appears important in achieving desirable high conversion rates and to drive the conversion substantially towards including substantially all of the available functional group reaction sites.

Some conversion can be identified with perfluorinated copolymer exposures to $SF_4$ and catalyst for as little as 0.10 hour. However, for relatively complete conversion of available functional group sites in a copolymer charge, 24 to 48 hours or more may be required depending upon temperature, pressure, screen size of the reacting copolymer, the catalyst ratio, and the molar $SF_4$ excess. Exposures less than about 24 to 48 hours will convert somewhat less than all the perfluorocarbon copolymer functional groups available; less than complete conversion may be desirable where, for example, treating membrane surfaces for later conversion of those surfaces to, for example, carbonyl based functionality.

It has been found that the reactions may be accomplished in MONEL®, a commercial nickel-copper alloy, equipment. Shafting and rotating equipment can be made from HASTELLOY-C®, a commercial nickel molybdenum and chromium alloy, and will perform satisfactorily. Packing for shafts and the like can satisfactorily be fabricated from Teflon®, a duPont fluororesin and, optionally molybdenum sulfide blended and available commercially. Elevated agitation is available using equipment such as a Parr Instrument Company reactor, Model 4531.

Certain solvents have been identified as having desirable solvating properties for NAFION-like copolymer resins. Solvated perfluorinated copolymer or copolymer at least partially solvated in a sol-gel like system offers a variety of use opportunities. Using gelatinous partial solution of NAFION, membranes and so-called solid polymer electrolytes (SPE) can be relatively easily fabricated for use in electrolytic cells. Coatings of NAFION can be solution applied to objects using conventional techniques. Where the copolymer is solution utilized while containing a substantial portion of $SO_2F$ functional groups, the $SO_2F$ functional groups in this copolymer can be converted to contain other desirable functional groupings after application.

A number of solvating dispersion medium have been identified for forming dispersions of the perfluorinated copolymer. Since each alone or more than one in combination can be used for dispersing the perfluorocarbon copolymer, they are conveniently referred to as dispersion media. Those effective at solvating perfluorocarbon having predominately $SO_2F$ functional groups are shown in Table I. These Table I solvating dispersion media are particularly effective in that they tend to form clear solutions of NAFION-like perfluorocarbon copolymer to about 5 to 25 weight percent and particularly at 5 to 10 weight percent at relatively elevated temperatures of 140° C. or greater, while forming gelatinous malleable dispersions at lower temperatures. Malleable dispersions available at or just above room temperature are particularly desirable. Use of the dispersions is desirable in forming an SPE, membranes, and in coating objects with NAFION-like copolymeric perfluorocarbon ion exchange resin.

TABLE I

| SOLVENTS FOR $SO_2F$ FUNCTIONAL GROUP PERFLUOROCARBON COPOLYMERS | |
|---|---|
| Halocarbon Oil | perfluoro-1-methyldecalin |
| perfluorooctanoic acid | decafluorobiphenyl |
| perfluorodecanoic acid | pentafluorophenol |
| perfluorotributylamine | pentafluorobenzoic acid |
| FC-70, a 3M product comprising perfluorotrialkylamine | |

It has been found that at least about an 85 percent conversion of sulfonyl halide based functional groups to sulfonyl fluoride is required to enable satisfactory solvation of NAFION following reaction in the Table I solvents.

The following example is offered to further illustrate the features and advantages of the instant invention.

EXAMPLE I

A charge of 100 grams of 1100 equivalent weight NAFION having pendant sulfonic acid functional groups is ground to a 100 percent through 40 mesh particle size. The particles are introduced into a Parr Instrument Company Model 4531 MONEL reactor having a HASTELLOY-C agitator.

Prior to introduction, the NAFION is dried at 60° C. for 3 days, preferably under vacuum. The reactor, also vacuum dried before introduction of the NAFION, is charged with the NAFION and then sealed. After redrying the reactor under vacuum, the base of the reactor is immersed in an acetone/dry ice bath. 46.0 grams of HF are charged to the reactor followed by 200 grams of $SF_4$. The reactor, removed from the cooling bath, is heated to 50° C. for 48 hours and stirred at 225 RPM. The reactor is cooled to 15° C., gaseous products vented and quenched, and the reactor is purged with $N_2$ for 5 minutes. Methanol is charged to the reactor sufficient to slurry the product which is removed for analysis.

Analysis for conversion to sulfonyl fluoride is by infrared technique.

Percent conversion to the sulfonyl fluoride was calculated as $$\% \, R_fSO_2F = 100\left(1 - \frac{A_{1060}}{(A_{980})(0.71)}\right)$$

where, $A_i$ is the infrared absorbance peak height and i refers to the absorbance peak position in cm$^{-1}$.

For this example, conversion totaled in excess of 90 percent. The product was dissolved in Halocarbon Oil for further processing.

The example was repeated for other relative ratios of SF$_4$, HF and 1100 equivalent weight NAFION having sulfonic acid functionality, the results are set forth in Table II. Some examples were made in a shaker reactor, others in the Parr stirred reactor.

TABLE II

| Run No. | T, °C. | Duration t, Hours | Reactor Charge, g. Resin | HF | SF$_4$ | $\phi^c \times 10^2$ | Conversion$^d$ to R$_f$SO$_2$F, % | Solubility$^b$ | Remarks |
|---|---|---|---|---|---|---|---|---|---|
| | | | | | | | | | Shaker reactor |
| 1 | 6 | 44 | 22* | 15 | 200 | 3.4 | 89 | | |
| 2 | 30 | 48 | 32* | 15 | 200 | 2.3 | 95 | X | 6 hours at 21° C. |
| 3 | 76 | 41 | 20* | 150 | — | 37.5 | 0 | | 5 hours at 22–26° C. |
| 4 | 49 | 24 | 42* | — | 200 | 0.0 | 40 | | |
| 5 | 50 | 23 | 33* | 15 | 200 | 2.3 | 85 | | |
| 6 | 31 | 48 | 139* | 22 | 300 | 0.8 | 80 | | |
| 7 | 31 | 48 | 36 | 15 | 200 | 2.1 | 90 | | |
| 8 | 52 | 48 | 36 | 18 | 209 | 2.5 | 85 | X | |
| 10 | 50 | 48 | 100 | 38 | 200 | 1.9 | 84 | X | |
| 11 | 53 | 48 | 109 | 38 | 200 | 1.7 | 86 | X | |
| 12 | 50 | 48 | 200 | 75 | 250 | 1.9 | 87 | X | |
| 13 | 50 | 48 | 200 | 75 | 250 | 1.9 | 86 | X? | |
| 14 | 50 | 48 | 200 | 75 | 250 | 1.9 | 81 | | |
| 15 | 50 | 48 | 50 | 35 | 200 | 3.5 | 83 | | |
| 16 | 50 | 48 | 50 | 35 | 190 | 3.5 | 83 | X? | |
| 17 | 51 | 48 | 200 | 75 | 250 | 1.9 | 83 | X? | |
| 18 | 50 | 48 | 190 | 70 | 250 | 1.8 | 75 | | |
| | | | | | | | | | Parr reactor |
| 19 | 46 | 42 | 30 | 10 | 150 | 1.7 | 42 | | Stir at 200 RPM |
| 20 | 30 | 48 | 100 | 46 | 200 | 2.3 | 77 | | Stir at 225 RPM |
| 21 | 30 | 48 | 100 | 46 | 200 | 2.3 | 89 | X? | Intermittent stirring |
| 22 | 50 | 48 | 100 | 46 | 200$^a$ | 2.3 | 81 | | 100 rpm |

$^a$100 mls of Freon 113 were added as an SF$_4$ diluent.
$^b$7% solution of resin in Halocarbon Oil at 240–245° C. X indicates complete solubility. X? indicates nearly-complete solubility with some gel particles present.
$^c\phi$ = moles of HF/gram of resin.
$^d$Calculated from infrared spectra of powdered product by attenuated total reflectance (ATR).
*1200 equivalent weight (all other resin is 1100 equivalent weight).

EXAMPLE II 33 grams of 1100 equivalent weight resin including some resin in sheets 5 mils and 10 mils thick were shaken with 15 grams HF and 200 grams SF$_4$ at 50° C. for 23 hours. Conversion of the resin sulfonic acid functional groups to SO$_2$F functionality to a depth of 2 mils from each resin sheet surface was achieved at 85 percent of the available sulfonic acid sites. Reaction procedures were identical with those of Example I.

EXAMPLE III 139 grams of 1100 equivalent weight resin including some resin in sheet 10 mils thick were shaken with 22 grams HF and 300 grams SF$_4$ at 31° C. for 48 hours. 80 pecent of available sulfonic acid sites on the resin to a depth of 2 mils from each sheet surface were converted to SO$_2$F functionality. Reaction procedures were identical with those of Example I.

While a preferred embodiment of the invention has been shown and described, it should be apparent that various modifications may be made therein without departing from the scope of the appended claims.

What is claimed is:

1. A method for forming sulfonyl fluoride functional groups within a polymeric material having at least one of: (a) attached sulfonyl based catonic exchange functional groups; and (b) sulfonyl based polymeric cross linking sites; comprising the step of: contacting the polymer with SF$_4$ and a catalyst at a temperature of between −20° C. and 200° C. for greater than 0.10 hour under pressure in a substantial excess of the catalyst.

2. A method for forming sulfonyl fluoride functional groups of a form O(CF$_2$)$_x$CF$_2$SO$_2$F adjacent surfaces of a polymeric material having at least one of: (a) attached cationic exchange functional groups selected from a group consisting of: O(CF$_2$)$_x$CF$_2$SO$_3^-$Z$^+$ and O(CF$_2$)$_x$CF$_2$SO$_2$OCH$_3$; and (b) sulfonyl based cross linking structures selected from a group consisting of O(CF$_2$)$_x$CF$_2$SO$_2$—Y—SO$_2$.CF$_2$(CF$_2$)$_x$O where:
 (i) $0 \leq X \leq 24$;
 (ii) Y is selected from a group consisting of the structure —O—, —O—O—, and di and poly amines of a form NH(CR$_1$R$_2$)$_x$NH with R$_1$ and R$_2$ being hydrogen, halogen, an amino group, and short chain alkanes and alkenes; and
 (iii) Z is one of an alkali or alkaline metal, an ammonium ion and hydrogen;
comprising the step of: contacting the polymeric material with a substantial molar excess of SF$_4$ and with a catalyst at a temperature of between about −20° C. and 200° C. for a period of at least 0.10 hour under at least autogenous pressure.

3. The method of claim 2 including the additional step of finely dividing the polymeric material prior to the contacting step.

4. The method of claim 2 including the further step of at least partially solvating polymeric material having formed sulfonyl fluoride functional groups in a solvating dispersion media subsequent to the contacting step.

5. A method of forming sulfonyl fluoride based functional groups at least adjacent surfaces of copolymeric perfluorocarbon material polymerized from at least two monomers, one such monomer consisting essentially of at least one fluorinated vinyl compound and the other monomer consisting essentially of at least one monomer having the structure:

$$CF_2=CAF, CF_2=CFR_1A, CF_2=CFOR_1A$$

with $R_1$ being a bifunctional perfluorinated radical having between 1 and 25 carbon atoms, the carbon atoms being at least once interruptable by one or more oxygen atoms, A being selected from a group consisting of sulfonate ester, sulfonamide and saponification products of sulfonyl halide; and for forming sulfonyl halide based sites of cross linking between such copolymers having the structure $O(CF_2)_xCF_2SO_2-Y-SO_2CF_2(CF_2)_xO$ wherein $0 \leq X \leq 24$, with Y being of the form of one of —O—, —O—O—, and di or poly amines, comprising the steps of: contacting the copolymeric material with a substantial excess of $SF_4$ and with one of a Lewis acid and HF at a temperature of between about $-20°$ C. and $200°$ C. for a period of greater than 0.10 hour under at least autogenous pressure.

6. The method of claim 5 wherein the catalyst is HF present in a ratio of moles HF per equivalent of copolymeric material of at least 10.

7. The method of claim 5 including the additional step of finely dividing the polymeric material prior to the contacting step.

8. The method of claim 5 including the further step of at least partially solvating polymeric material having formed sulfonyl fluoride functional groups in a solvating dispersion media subsequent to the contacting step.

9. The method of claim 5 including the step of at least partially solvating copolymeric material having formed sulfonyl fluoride functional groups in a dispersion media selected from a group consisting of: Halocarbon Oil, perfluorooctanoic acid, perfluorodecanoic acid, perfluorotributylamine, perfluoro-1-methyldecalin, decafluorobiphenyl, pentafluorophenol, FC-70, and pentafluorobenzoic acid, subsequent to the contacting step.

10. A method for converting sulfonyl halide based functional derivatives and cross linking sites attached to polymeric material, at least adjacent to surfaces of the polymeric material, to sulfonyl fluoride functional groups, comprising the step of: contacting the polymer with $SF_4$ and a catalyst at a temperature of between $-20°$ C. and $200°$ C. for greater than 0.10 hour under pressure in a substantial excess of at least one of the catalyst and $SF_4$.

11. A method for converting sulfonyl halide based functional derivatives and cross linking sites selected from a group consisting of $$O(CF_2)_xCF_2SO_3{}^-Z^+,$$

$$O(CF_2)_xCF_2SO_2OCH_3 \text{ and}$$

$$O(CF_2)_xCF_2SO_2-Y-SO_2CF_2(CF_2)_xO \text{ where:}$$

(i) $0 \leq X \leq 24$;

(ii) Y is a structure selected from a group consisting of: —O—, —O—O—, and di or poly amines; and (iii) Z is one of hydrogen and an alkali or alkaline metal and quaternary amine;

to sulfonyl fluoride functional groups, comprising the steps of: contacting the polymeric material with a substantial molar excess of $SF_4$ and with a catalyst selected from a group consisting of Lewis acids and HF at a temperature of between about $-20°$ C. and $200°$ C. for a period of greater than 0.10 hour under at least autogenous pressure.

12. The method of claim 11 including the additional step of finely dividing the polymeric material prior to the contacting step.

13. The method of claim 11 including the further step of at least partially solvating polymeric material having converted sulfonyl fluoride functional groups in a dispersion media subsequent to the contacting step.

14. A method of converting sulfonyl halide based functional groups at least adjacent surfaces of copolymeric perfluorocarbon material polymerized from at least two monomers, one such monomer consisting essentially of at least one fluorinated vinyl compound and the other monomer consisting essentially of at least one monomer having the structure:

$$CF_2=CFA, CF_2=CFR_1A, CF_2=CFOR_1A$$

with $R_1$ being a bifunctional perfluorinated radical having between 1 and 25 carbon atoms which carbon atoms being at least once interruptable by one or more oxygen atoms and A being selected from a group consisting of sulfonate ester, sulfonamide, and saponification products of sulfonyl halide; and for converting sulfonyl halide based sites of cross linking between such copolymers having the structure $O(CF_2)_xCF_2SO_2-Y-SO_2CF_2(CF_2)_xO$ wherein $0 \leq X \leq 24$, with Y being of the form of one of —O—, O—O, and di or poly amines, comprising the steps of: contacting the copolymeric material with a substantial excess of $SF_4$ and with a catalyst selected from a group consisting of Lewis acids and HF at a temperature of between about $-20°$ C. and $200°$ C. for a period of greater than 0.10 hour under at least autogenous pressure.

15. The method of claim 14 wherein the catalyst is HF present in a ratio of moles HF per gram copolymeric material of at least 0.010.

16. The method of claim 14 including the additional step of finely dividing the polymeric material prior to the contacting step.

17. The method of claim 14 including the further step of at least partially solvating polymeric material having converted sulfonyl fluoride functional groups in a dispersion medium subsequent to the contacting step.

18. The method of claim 14 including the step of at least partially solvating copolymeric material having converted sulfonyl fluoride functional groups in a dispersion medium selected from a group consisting of: Halocarbon Oil, perfluorooctanoic acid, perfluorodecanoic acid, perfluorotributylamine, perfluoro-1-methyldecalin, decafluorobiphenyl, pentafluorophenol, FC-70, and pentafluorobenzoic acid.

* * * * *